(No Model.) 2 Sheets—Sheet 1.

J. A. MENGEL.
SEED PLANTER.

No. 533,480. Patented Feb. 5, 1895.

Witnesses
G. A. Tauberschmidt
D. W. Reinohl

Inventor
Joseph A. Mengel
By D. W. Reinohl
Attorney (No Model.) 2 Sheets—Sheet 2.
J. A. MENGEL.
SEED PLANTER.
No. 533,480. Patented Feb. 5, 1895.
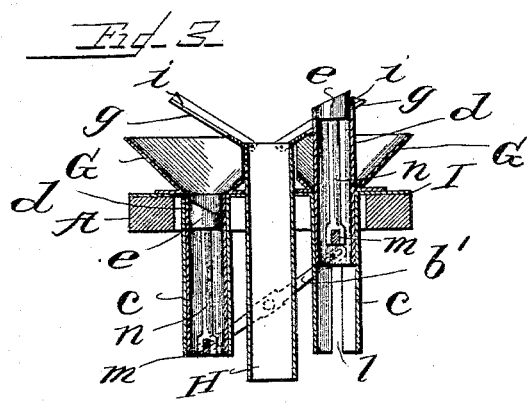
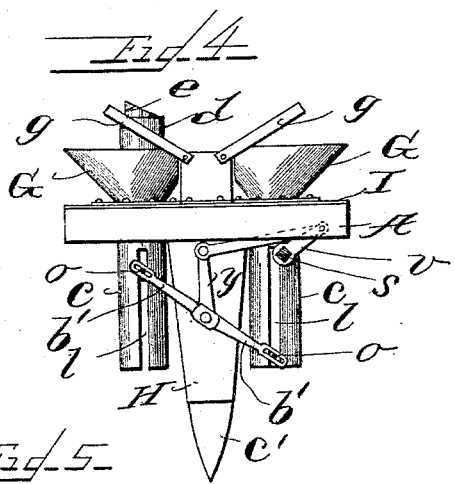
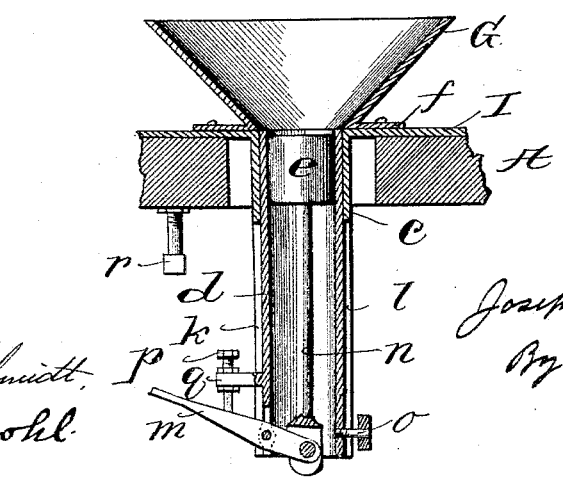
Witnesses
Inventor
Joseph A. Mengel
By D. L. Reinohl
Attorney

UNITED STATES PATENT OFFICE.

JOSEPH A. MENGEL, OF McKEANSBURG, PENNSYLVANIA.

SEED-PLANTER.

SPECIFICATION forming part of Letters Patent No. 533,480, dated February 5, 1895.

Application filed March 31, 1894. Serial No. 505,848. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Seed-Planters; and I do hereby declare the following to be a full, clear, and exact description of the invention, such as will enable others skilled in the art to which it appertains to make and use the same.

My present invention relates to agricultural implements and has especial reference to that class of implements known as seed-planters and which are used for planting corn or potatoes and has for its object certain improvements in construction which will be fully disclosed in the following specification and claims.

Figure 1:
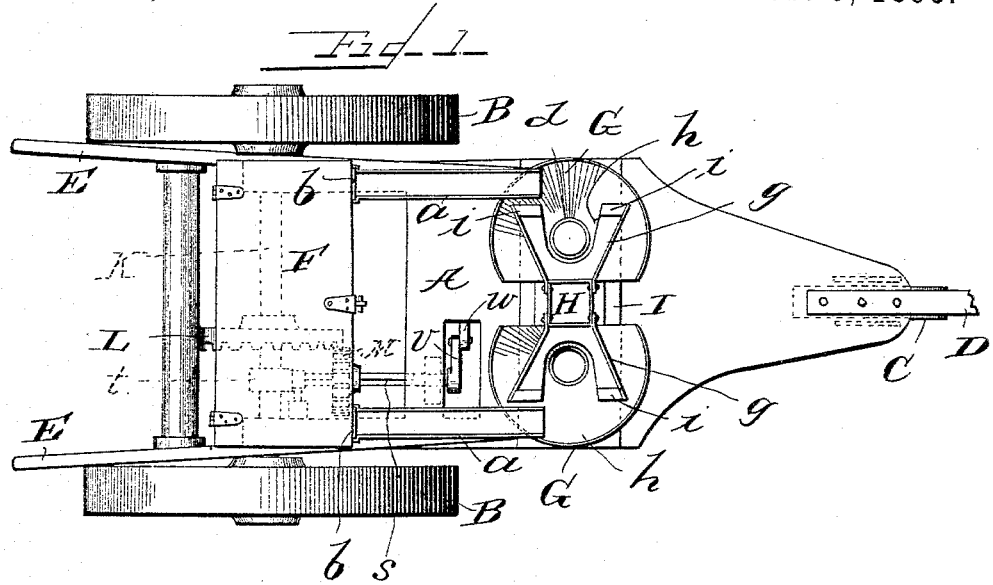
Figure 2:
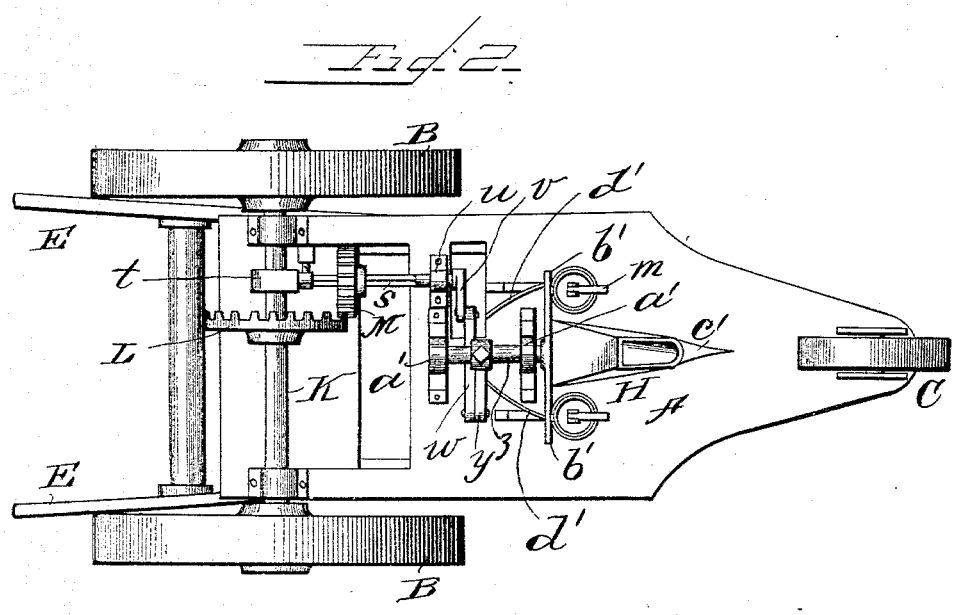

In the accompanying drawings, which form part of this specification, Figure 1 is a top plan view of my improved form of planter; Fig. 2, an inverted plan of the same; Fig. 3, a vertical transverse section of the frame of the planter and the feeders, the plungers being shown in side elevation; Fig. 4, a rear elevation, showing the frame of the planter, the feeders, the seed delivery tube and the furrow opener, and Fig. 5 a vertical section of one of the feeders and the frame of the planter on an enlarged scale and at a right angle to the position shown in Fig. 4, the plunger being shown in side elevation.

Reference being had to the drawings and the letters thereon, A indicates the frame of the planter, B, B, the side wheels, and C, the front wheel. To the front end of the frame is attached the usual pole D, and at the rear end are the handles E, E, for guiding the planter. On the handles and arranged transversely of the planter is a seed-box F, provided with spouts $a$ $a$ having slide valves $b$ $b$ therein for supplying seed to the hoppers G, G, from which the seed is taken by the feeders.

The feeders each comprise an outer fixed cylinder $c$ which with the delivery-tube H, are cast or otherwise formed integral, or detachably secured to the plate I, which crosses the planter-frame transversely, an inner and vertically reciprocating cylinder $d$ and a reciprocating plunger $e$; above all of which the hopper G, is secured by its flange $f$ to the plate I, by suitable bolts, as shown in Figs. 3, 4 and 5. The delivery-tube H, being common to both feeders when two are employed, but only one feeder may be supplied to a planter. To the upper end of the delivery-tube are pivotally secured inclined chutes $g$ $g$ upon which the seed is delivered by the plungers $e$ and by the chutes conveyed to the delivery-tube. The chutes are cut away at $h$ to allow the upper end of the cylinder $d$ to pass above the chutes to discharge the seed thereon, and are pivotally secured to the delivery-tube H, to allow them to rise in the event that a grain of seed should lodge between the cylinder $d$ and the chute and thus prevent injury to the machine from this source. The chutes are weighted at their outer and free ends $i$ to automatically return the chutes when they have been raised by the cylinder $d$. The cylinder $d$ in its reciprocations rises above the chute $g$ and the plunger $e$ is projected above the upper end of said cylinder to discharge seed from the cylinder, as shown in Figs. 3 and 4. The outer cylinder $c$ is provided with oppositely arranged vertical slots $k$ $l$, in the former of which the tripping lever $m$ pivotally secured to the cylinder $d$ and to the outer end of the plunger-rod $n$ reciprocates, and in the latter the stud $o$ by which the cylinder $d$ is operated reciprocates.

The plunger $e$ is adjusted in the cylinder $d$ to regulate the quantity of seed to be dropped by a set screw $p$ in an arm or bracket $q$ projecting from the cylinder $d$ through the slot $k$ in the cylinder $c$ and the plunger with the seed upon it projected out of the cylinder $d$ by lever $m$ coming in contact with a downwardly projecting adjustable screw stud $r$, shown in Fig. 5.

Upon the axle K, is secured a gear-wheel L, which meshes with a pinion M, on shaft $s$, which shaft is supported at its rear end by the axle K upon which is a head or strap $t$ into the end of which the shaft $s$ enters, and the opposite end of the shaft $s$ is supported on the frame of the planter by a strap $u$, as shown in Figs. 1 and 2. The wheel L may be provided with a series of concentric sets of gear teeth and the pinion M may be adjusted on the shaft $s$ to vary the intervals at which the seed shall be dropped as is common in agricultural implements. To the shaft $s$ is attached a crank $v$ to which is attached a rod $w$ and said rod is connected to the arm $y$ of a rock shaft $z$ supported in hangers $a'$ $a'$ secured to the frame of the planter, and on one end of the rock shaft $z$ is secured a crank having two arms $b'$ $b'$ one of which is attached to each of the cylinders $d$ of the feeder by the stud $o$.

The feeders are operated alternately by power imparted to the cylinders $d$ and the plungers $e$ from the axle K when two feeders are used. To the front end of the delivery-tube H is secured a furrow-opener $c'$ and in the rear of the feeders are suitable furrow-closers $d'$ $d'$.

In the operation of the planter the seed gravitates from the hoppers G down into the cylinder $d$ and upon the upper end of the plunger, which upper end may be inclined inward toward the delivery-tube, as shown in Fig. 3, to direct the seed toward the chutes $g'$ $g'$, and from the fact that the feed cylinders rise above the chutes, the operator can see whether the machine is working properly or not.

When the planter is desired for planting potatoes, the feeder is made correspondingly larger than when for planting corn.

Having thus fully described my invention, what I claim is—

1. In a seed-planter, a feeder comprising an outer fixed cylinder; an inner reciprocating cylinder, a plunger having a lever pivotally attached to the lower end of its rod and an adjusting device for said plunger supported by said reciprocating cylinder and engaging said lever, in combination with means for actuating the feeder.

2. In a seed-planter, the combination of a feeder provided with a vertically reciprocating cylinder and plunger and a hopper a delivery-tube and a chute pivotally secured to the upper end of the delivery-tube.

3. In a seed-planter, a feeder comprising an outer fixed cylinder, an inner reciprocating cylinder, a plunger having an inclined upper end and a lever pivotally attached to the lower end of its rod, and an adjusting device for said plunger supported by said reciprocating cylinder and engaging said lever, in combination with a hopper, a delivery-tube and means for actuating the feeder.

4. In a seed-planter, the combination of a feeder having a reciprocating cylinder and plunger an outer vertically slotted cylinder, a crank connected to said inner cylinder by a stud projecting through said slot in the outer cylinder, and a rock shaft having an arm thereon connected to the axle of the planter by suitable intermediate connections.

In testimony whereof I affix my signature in presence of two witnesses.

JOSEPH A. MENGEL.

Witnesses:
H. C. WILSON,
H. K. WESTON.